United States Patent [19]
Green et al.

[11] Patent Number: 6,090,363
[45] Date of Patent: Jul. 18, 2000

[54] METHOD OF OPENING AND FILLING CARBON NANOTUBES

[75] Inventors: Malcolm L. H. Green; Shik C. Tsang, both of Oxford, United Kingdom

[73] Assignee: ISIS Innovation Limited, Oxford, United Kingdom

[21] Appl. No.: 08/809,323

[22] PCT Filed: Sep. 20, 1995

[86] PCT No.: PCT/GB95/02235

§ 371 Date: Apr. 10, 1997

§ 102(e) Date: Apr. 10, 1997

[87] PCT Pub. No.: WO96/09246

PCT Pub. Date: Mar. 28, 1996

[30] Foreign Application Priority Data

Sep. 20, 1994 [GB] United Kingdom .................. 9418937

[51] Int. Cl.⁷ .............................. D01F 9/12; D01F 11/12
[52] U.S. Cl. .................................. 423/447.1; 423/445 B; 423/460; 423/DIG. 40; 427/216
[58] Field of Search ........................ 423/445 B, DIG. 39, 423/DIG. 40, 447.2, 460, 447.1; 427/216

[56] References Cited

U.S. PATENT DOCUMENTS

| | | | |
|---|---|---|---|
| 5,346,683 | 9/1994 | Green et al. | 423/447.2 |
| 5,457,343 | 10/1995 | Ajayan | 423/447.2 |
| 5,547,748 | 8/1996 | Ruoff | 423/439 |
| 5,549,973 | 8/1996 | Majetich | 423/448 |
| 5,560,898 | 10/1996 | Uchida | 423/447.2 |
| 5,641,466 | 6/1997 | Ebbesen | 423/447.2 |
| 5,698,175 | 12/1997 | Hiura | 423/447.1 |

OTHER PUBLICATIONS

Ebbesen, T.W., et al. "Purification of Nanotubes", Nature, vol. 367, p. 519, Feb. 10, 1994.
Tsang, S.C. et al. "A simple chemical method of opening . . . " Nature, vol. 372, No. 6502, Nov. 10, 1994, pp. 159–162.
Lago, R.M. et al. "Filling carbon nanotubes with small palladium . . . " J. Chem. Soc. Chem. Commun. , No. 13, Jul. 7, 1995, pp. 1355–1356.
X.K. Wang et al. "Cabon nanotubes . . . " Applied Physics Letters, vol. 66, No. 18, May 1, 1995, pp. 2430–2432.
K.C. Hwang. "Efficient cleavage of carbon . . . " J. Chem. Soc., chem. Commun., 1995, pp. 173–174.
P.M. Ajayan et al. "Capillary–induced filling of . . . " Nature, vol. 361, No. 6410, Jan. 28, 1993, London, GB, pp. 333–334.
P.M. Ajayan et al. "Opening carbon nanotubes . . . " Nature, vol. 362, No. 6420, Apr. 8, 1993, London, GB, pp. 522–525.
M. Ata et al. "Localized incorporation of Lanthanum . . . " Advanced Materials, vol. 6, No. 7/8, Aug. 1994 Weinheim, DE., pp. 590–592.
S.C. Tsang et al. "Thinning and opening of carbon nanotubes . . . " Nature, vol. 362, No. 6420, Apr. 8, 1993, London, GB, pp. 520–522.

*Primary Examiner*—Steven P. Griffin
*Assistant Examiner*—Peter DiMauro
*Attorney, Agent, or Firm*—Nixon & Vanderhye

[57] ABSTRACT

Method of making carbon nanotubes open on at least one end wherein capped nanotubes are treated with an oxidizing acid such as nitric acid. The treatment is effective to open at least 50% of the nanotubes on at least one end.

6 Claims, 4 Drawing Sheets

METHOD OF OPENING AND FILLING CARBON NANOTUBES

This application is the National Stage of PCT/GB95/02235, filed Sep. 20, 1995.

BACKGROUND

Carbon nanotubes, or so called 'buckytubes', were first observed by Iijima in 1991[1]. A method for macroscopic synthesis of nanotubes giving gram quantity of the material has been subsequently described[2]. Typically, the nanotubes consist of multilayers (normally 2–50) of concentric carbon tubes which are capped at both ends. The tubes are built up of sheets of carbon atoms arranged in hexagons and pentagons, with the pentagons concentrated in areas of low radius of curvature such as the tube ends. The tubes contain a hollow core up to 50 nm across typically 100–200 nm in length.

There has been much speculation on the possible physical and chemical properties of filled nanotubes, especially novel magnetic, mechanical, electrical, optical and catalytic properties[3]. However, no suitable method for opening and filling the carbon nanotubes with a variety of materials is currently available. There have previously been attempts to insert materials into the tubes by using composite metal-carbon electrodes during arc vaparisation[4-9]. These high temperature methods favour the production of metal carbides, the techniques can only be applied to a limited number of materials. In addition, the metal carbides or metal particles are encapsulated by carbon shells, and are thereby isolated from their environment. It has also been reported that if the nanotube is heated in air with lead, the tip of the tube can be opened, followed by the filling of the tube with the molten lead. About it of the tubes were filled in this manner and the presence of internal caps frequently limit the amount of tube filling. Recently, there have been two independent reports of the selective oxidation of nanotubes by carbon dioxide[11] or oxygen[12] in which ends of the nanotubes could be removed at temperatures >600° C. leaving a small portion 2–10%) of opened tubes. Oxidation in this manner also removes the outer layers of hexagonal carbon which form the body of the tubes. In consequence the tubes become thinned. In extremity they can lead to the formation of single layered tubes[11]. The filling of open tubes prepared by these gas phase oxidations has proved difficult, probably due to the presence of amorphous carbon blocking the tubes[12]. Here we describe a simple wet and highly selective method for the opening of the ends of nanotubes in very high yields, and the filling of these opened tubes with metal compounds.

THE INVENTION

In one aspect the invention provides carbon nanotubes open on at least one end and containing material deposited therein. Generally at least 40%, preferably at least 70% and desirably 100%, of the carbon nanotubes are open on at least one end of the tubes which are open on at least one end, generally at least 10% e.g. at least 40%, preferably at least 70% and desirably 100%, contain material deposited therein. The invention also provides a method of making these open filled carbon nanotubes which method comprises treating capped nanotubes with a liquid comprising an oxidizing agent and a material for deposition in the uncapped nanotubes.

In another aspect, the invention provides carbon nanotubes of which at least 50%, preferably at least 80% and desirably 100%, are open on at least one end. These may be made by treating capped nanotubes with a liquid comprising an oxidising agent.

The material deposited within the open-ended carbon nanotubes may be selected from a wide range, of which the following are examples:

Metals or alloys in elemental form, such as d-block or f-block transition metals; such metals or allows in combined form, e.g. combined with oxygen or carbon; organic compounds, such as may be used for medical purposes; one or more of the elements Li, Na, K, Rb, Cs, Be, Mg, Ca, Sr, Ba, S, Al, Sc, Y, La, Si, Ge, Sn, N, P, As, Sb, Bi, O, Se, Te, F, Cl, Br, I, He, A, Kr, Xe, which may be useful as heterogeneous catalysts; materials which have ferrimagnetic properties; materials which have molecular sieving properties, and which may be useful as heterogeneous catalysts; materials which have specific ion binding properties; organic compounds capable of chelating or binding metal ions; materials with ferromagnetic properties; one of more of the elements Ti, Zr, Rf, V, Nb, Ta, Cr, Mo, W, Mn, Tc, Re, Fe, Ru, Os, Co, Rh, Ir, Ni, Pd, Pt, Cu, Ag, Au, which may be used as heterogeneous catalysts; organometallic compounds; molybdenum compounds; zeolites; saturated hydrocarbons; plant cells; animal cells; proteins; amino acid compounds; deoxynucleic acids; radioactively labelled elements and compounds; viruses; eta-cyclopentadienyl transition metal compounds; compound of the d-block or f-block metals with tertiary phosphine ligands; other allotropes of carbon; aqueous solutions of metal ions; Bronstead acids; aqueous solutions of pH 0 to 14; materials with ion exchange properties materials with superconducting properties preferably in the temperature range 100–450° Kelvin.

Carbon nanotubes open on at least one end may be made by treating capped nanotubes with a liquid comprising an oxidising agent, e.g. An acidic or basic aqueous or non-aqueous solution of an oxy anion of N, Mn, Cr, V, Os or Ru, hydrogen peroxide, persulphate, or oxyhalogen anion of F, Cl, Br, I such as chlorate, bromate, periodate. Preferred are aqueous solutions of chromic and particularly nitric acid. Preferably capped carbon nanotubes are refluxed in concentrated nitric acid for a time sufficient to first thin and then remove a high proportion of the end caps, which time may typically be in the range of 10 minutes to 48 hours.

Preferably the liquid comprising an oxidising agent also comprises a material for deposition in the uncapped nanotubes. For example this material may comprise an aqueous or non-aqueous solution of a salt of the chosen metal. Alternatively, carbon nanotubes which are open on at least one end may be treated with a liquid comprising the material to be deposited therein.

After this wet treatment, the filled carbon nanotubes may be dried and heated in an inert or reducing gas to convert the deposited material to the desired physical or chemical form.

This wet oxidation method has several advantages over the gaseous oxidation methods previously described[11, 12]. Attack by nitric acid (and presumably by other oxidising anions) occurs very specifically on the three-dimensionally curved portions of the initial nanotubes, and there appears to be little or no observable thinning of the walls. This is clearly indicated in FIG. 3 below, where the number of layers of carbon in the straight parts of the tubes are unchanged whilst the curved portions have been effectively destroyed. In other words, nitric acid and related wet oxidation systems are much more specific. Also, the process using nitric acid and other wet systems is carried out at temperatures below 150° C., whereas gaseous methods typically require initiatior temperatures of at least 400° C.

and, being an exothermic reaction, no doubt temperatures will rapidly exceed this. The oxidation of tubes using carbon dioxide does not take place until temperatures are in excess of 6–700° C.

Electron-micrographs show that a significant proportion of the open nanotubes of this invention have openings (created by the wet oxidation technique) which are significantly smaller in their average diameter than the original inner tube diameter. This is shown for example in FIG. 1b below. This feature creates the possibility of forming molecules inside the tube which are trapped by what may be described as a lobster-pot principle. Each of components A and B is separately small enough to pass into and out of the tubes. The compound AB may be formed inside the tubes and be too large to escape.

Another possible application takes advantage of the small inner tube dimensions, e.g. about 50 Å, whereby long thin molecules can be placed in the tube and are unable to rotate in three dimensions but only about the tube axis, The consequence of such an alignment of molecules has interesting implications in their spectroscopic properties which, for example, using nmr techniques may give rise to potentially extremely useful structural data.

BRIEF DESCRIPTION OF THE DRAWINGS

Reference is directed to the accompanying drawings in which.

EXPERIMENTAL

EXAMPLE 1

Figure 1A:
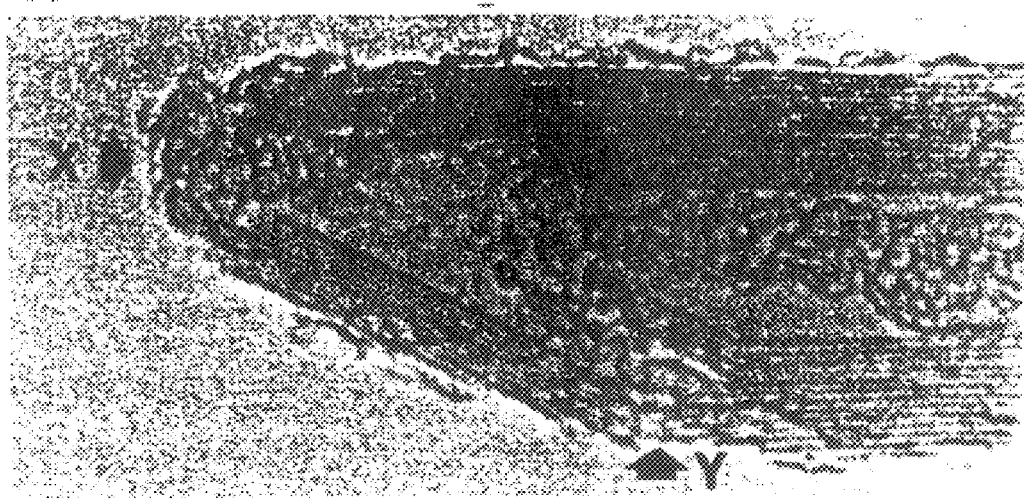
FIG. 1 shows typical high resolution electron micrographs of nitric acid treated nanotubes. (a) Attack has occurred at points X and Y where non-six membered carbon-rings are present. (b) and (c), showing the destruction of multiple internal cap by nitric acid treatment. The scale bar is 50 Å.
Figure 1B:
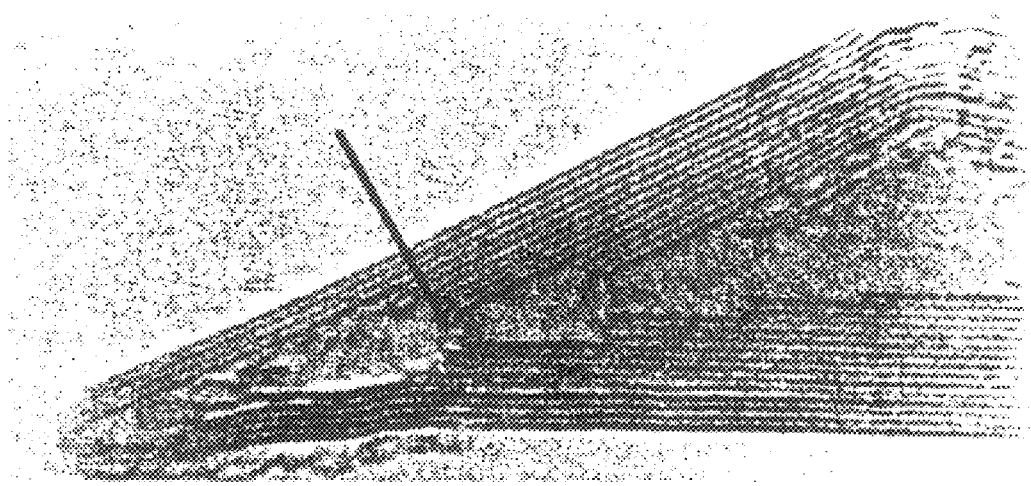
Figure 1C:
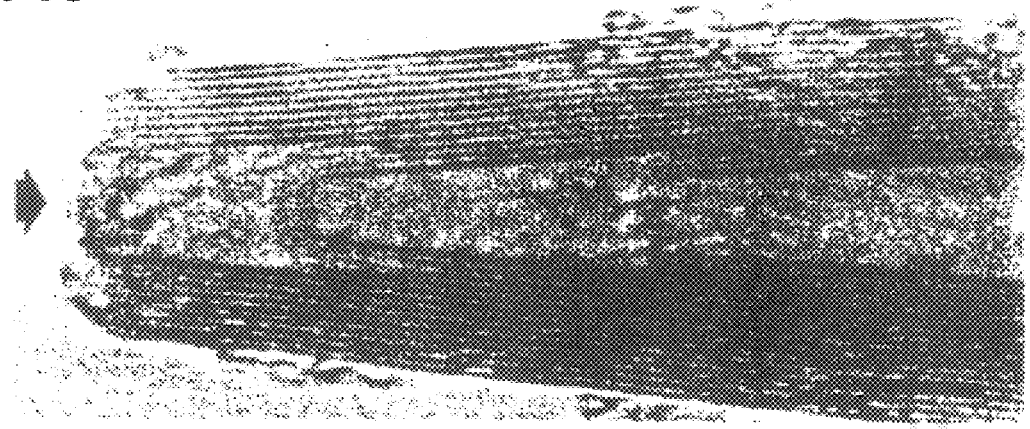

Samples of nanotubes were prepared by arc vaporisation as described earlier[11] this method provides 15 g/hour of sublimed cathodic carbon which contains the nanotubes (ca. 25%) together with other nanoparticles. Samples (2 g) of this carbon were suspended in concentrated nitric acid (68% AnalaR grade, BDH) and were refluxed for 4.5 hours at 140° C. A weight loss of less than 2% was recorded. After washing with distilled water and drying at 100° C. overnight, the black insoluble product was sonicated in chloroform and dried in vacuo. They ware examined by high resolution transmission electron microscopy, an accelerating voltage of 100 kV was used to avoid beam damage of the carbon material and the microscope was operated at optimum defocus. The micrographs showed the ends of ca. 80% of the tubes were opened. About 90% of the tubes were found to be opened in a sample treated with nitric acid for 24 hours, though some amorphous carbon was also present. These values were estimated by examining 60 tubes with ends protruding from the sample aggregates. Typical high resolution electron micrographs of nitric acid treated nanotubes are shown in FIG. 1. Close examination of nanotubes reveals that the tubes have been attacked specifically at those points where the curvature of the tube implies the presence of non-six membered carbon-rings (probably, five membered carbon ring). For example, attack occurred at points X and Y as shown in FIG. 1(a). It is interesting to note that the curve areas of all the internal caps (partitions) are also be attacked giving unobstructed tubes, as shown in FIGS. 1(b) and 1(c). The opened tubes appear to be empty. We have also examined the nanoparticles that accompany nanotubes[13] and found that these are also selectively attacked at the regions of greatest curvature. Due to the aggregation of the long nanotubes in the sample, it is difficult to examine both ends of a single tubule. However, the high yield of opened tube implies a considerable proportion are uncapped at both ends.

EXAMPLE 2

Figure 2A:
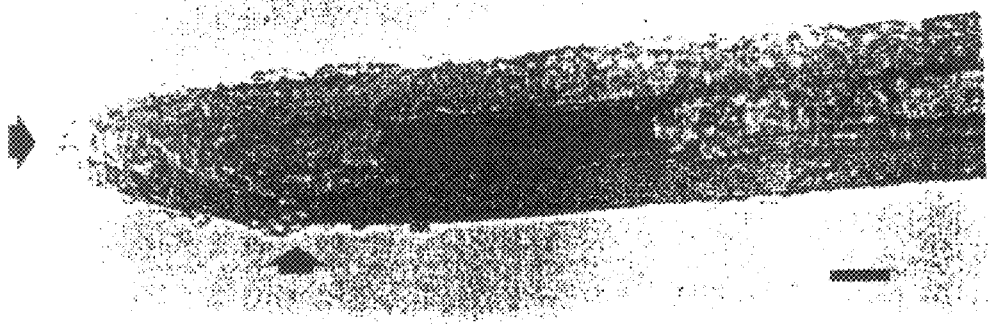
FIG. 2(a) shows a high resolution electron micrograph of a nickel material-filled nanotube also opened at points X and Y, the observed fringes of 2.40±0.05 Å correspond to (111) NiO crystal planes. The scale bar is 50 Å. (b) a tracing of the layer planes is provided for clarity.
Figure 2B:
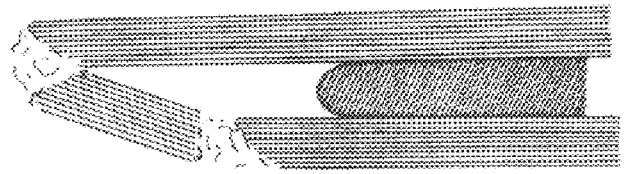

The preparation of filled nanotubes was carried out by suspending capped nanotubes in a solution of nitric acid Containing hydrated nickel nitrate (2.5% w/w) and refluxing for the 4.5 hours. The resulting insoluble black product was filtered and dried in an 100° C. overnight. the sample was then heated in a stream of helium at a rate of 10° C./min from room temperature to 100° C. and kept at this temperature for an hour before ramping at 4° C./min to 450° C. The sample was then annealed for 5 hours at this temperature. Electron micrographs showed that many (ca. 80%) of the nanotubes had been opened by nitric acid treatment and that of these about 60–70% contained nickel material. Some nickel-containing material was also observed on the exterior of the nanoparticles and nanotubes. No intercalation of nickel material between carbon layers of the nanotubes was observed. A typical micrograph of a nickel containing tube is shown in FIG. 2. Close examination of the nickel material inside the tubes showed lattice fringes with an observed fringe separation of 2.40±0.05 Å, this value is consistent with the interlayer separation of the (111) crystal plane of NiO 92.41 Å). X-ray powder diffraction (not shown) also indicates the presence of nickel oxide. It is interesting to note that the (111) NiO plane is always aligned at approximately 55–65° to the graphite layers (0002) of the tube. Most of the nickel oxide crystallites have diameters almost equal to the internal cross-section of the tubes (3–6 nm) and have lengths varying between 10–30 nm. The nickel oxide crystallites can also be observed considerably distance from the opened ends. It can be envisaged that nickel nitrate solution was sucked into the tubes as they were opened and crystalline nickel oxide was formed during calcination. The form of growth of NiO crystallites may be influenced by the surface structure of the inner tube and the elongated shape of the NiO crystallites may reflect surface wetting properties.

Nanotubes filled with NiO can also be prepared by immersing empty and dried opened tubes in nickel nitrate solution followed by evaporation and calcination as before, However, the percentage of filled tubes is less (ca. 20–30%) than the in situ one-step method.

FIG. 2 shows that the nickel oxide crystal is oriented with all the crystal plane at the same angle to the axis of the tube. This same angle is observed in all the other samples of nickel oxide crystals in other open tubes. In other words, the crystals are uniquely oriented within the tubes. As a result of being accessible only from certain directions, the crystals may thus act to catalyse very specific chemical reactions, more specific than is possible with the corresponding polycrystalline catalyst accessible from all sides.

EXAMPLE 3

Tubes filled with reduced nickel oxides, when treated with carbon monoxide and hydrogen mixtures, will catalyse the reduction of the carbon monoxide by the hydrogen giving methane. In other words, the reduced nickel oxide tubes act as methanation catalysts in a typical test run, a mixture of CO and hydrogen (1:1 by volume) was passed over a 50 mg sample of nanotubes containing reduced nickel oxide at a flow rate of 25 cm$^3$ per minute and at a temperature of 200 to 400° C. Gas chromatograph analysis of the outflowing gas showed greater than 80% conversion to the product methane.

EXAMPLE 4

Figure 3A:
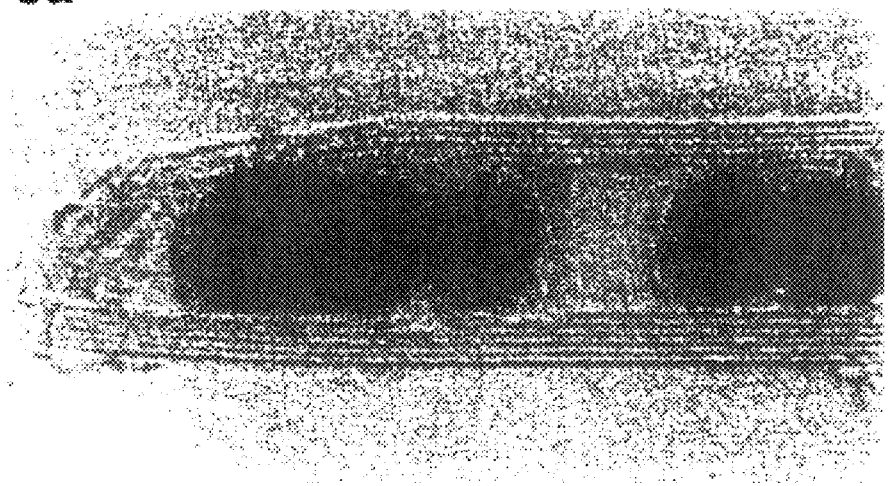
FIG. 3 shows high resolution electron micrographs of nanotubes filled with uranium oxide. The observed fringes of 3.15±0.05 Å correspond to the (111) $UO_{2+x}$ crystal planes (refer to 5-550 JCPDS-ICDD 1990). The scale bar is 50 Å.
Figure 3B:
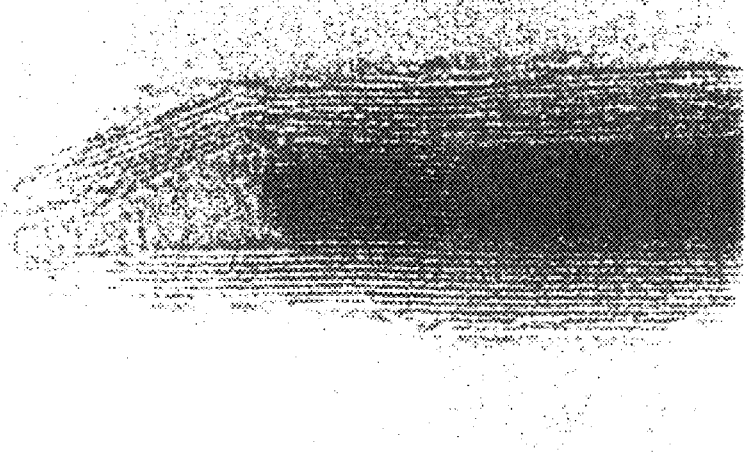
Figure 3C:
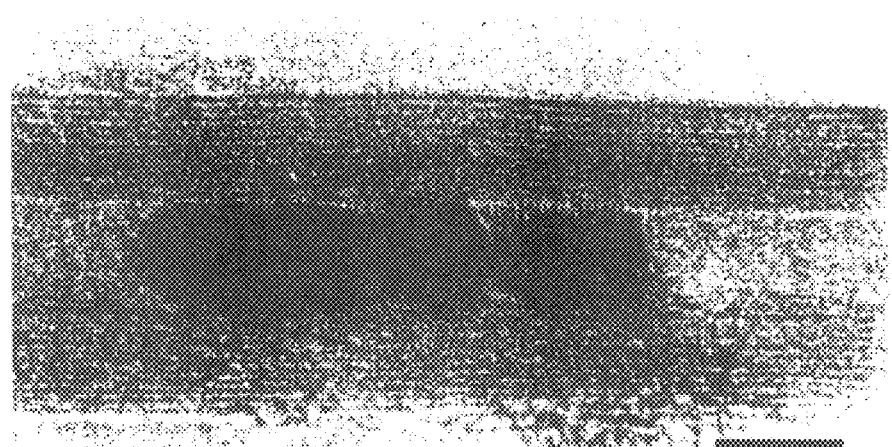

Treatment of closed nanotubes with a nitric acid solution of uranyl nitrate for 4.5 hours gave open-ended nanotubes containing uranium. It is estimated that 70% of the tubes contain uranium oxide material. FIG. 3 shows crystallites in the inner tube with lattice fringes of 3.15±0.005 Å. These are randomly oriented with respect to the graphite layers. The layer separation corresponds to that reported for (111) $UO_{2+x}$ crystallographic planes. Other interlayer separations determined from the transmission electron microscopy and x-ray powder diffraction spectra are also consistent with the fluorite structure of $UO_{2+x}$; the precise value of x is not known. The $UO_{2+x}$ crystallites are ellipsoidal with lengths varying between 3–8 nm. The observed contact angles, usually >100° suggest the uranium oxide crystallites wet the carbon surface poorly. We have found that most of the uranium oxide particles can be dissolved from the inner tubes by treatment with concentrated aqueous nitric acid at room temperature for a few minutes.

Samples of closed nanotubes were also heated in a nitric acid solution containing cobalt nitrate or iron nitrate. Following the standard heat treatment the resulting black residues were shown by electron microscopy and XRD to contain oxides of cobalt or iron material, respectively.

Figure 4:
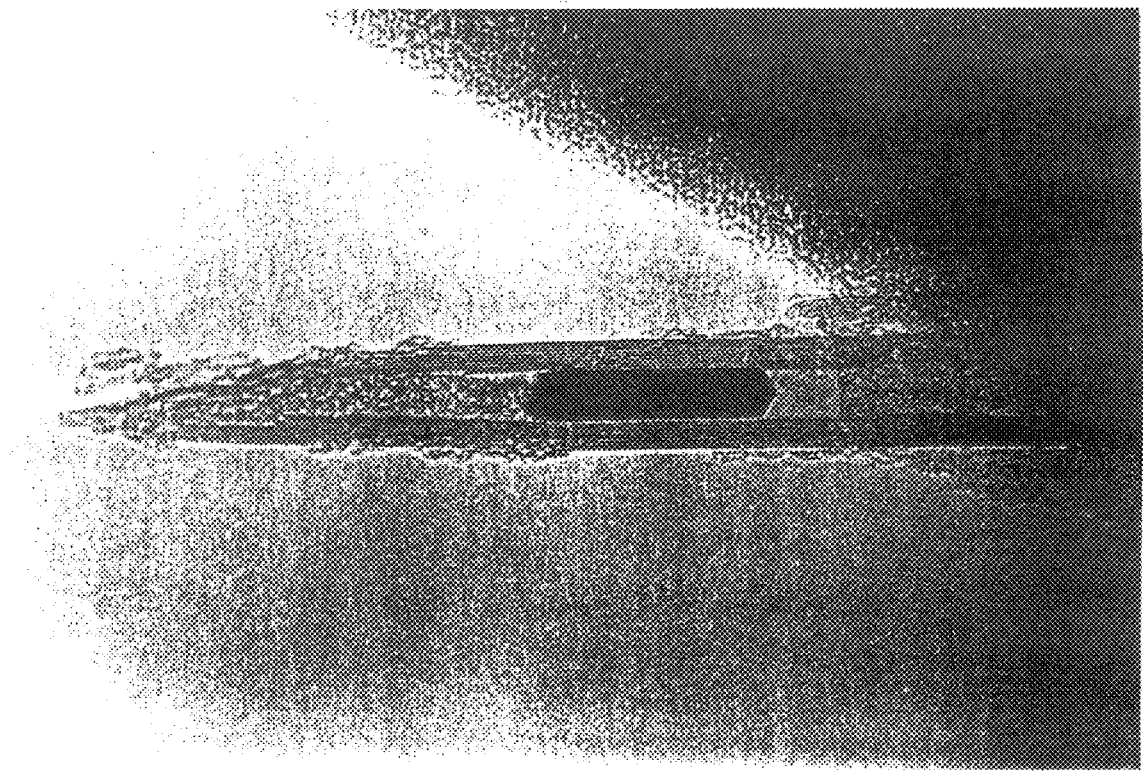
FIG. 4 shows a high resolution electron micrograph of a nanotube filled with nickel material by hydrogen reduction of a NiO filled precursor: the faceting of the particles typical for a single crystal of nickel metal. The scale bar is 50 Å.

The samples containing the oxides of Ni, Co or Fe were treated under hydrogen at 400° C. for 2 hours Close examination of the reduced materials showed a change of morphology of the resulting crystallites and the loss of the lattice fringes associated with the original oxide (NiO). The FIG. 4 shows the appearance of a crystal formed by reduction of a nickel oxide crystallite. The appearance of facets on the end of the nickel particle is typical for a metallic crystal. Further, we found that all the reduced samples displayed ferromagnetism and were strongly attracted to a simple permanent magnet. These observations clearly suggest that the hydrogen treatment has reduced the metal oxides in the nanotubes giving nanomagnuts.

EXAMPLE 5

The presence of a substantial concentration of surface acid functionalities on the open nanotubes has been demonstrated by acid-base titration and by temperature-programmes decomposition experiments. The data are consistent with a concentration of surface acid groups of about $1.0 \times 10^{20}$ acid sites per gramme.

Palladium metal filled nanotubes have been prepared from closed nanotubes (1.0 g) using nitric acid (20.0 g) containing 0.1 g of $Pd(NO_3)_2$ by refluxing for 24 hours. After draining the excess of nitric acid solution the sample was dried in air and then reduced using $H_2$ at 250° C. A high resolution transmission electron microscopy (HRTEM) picture of palladium single crystals in a sample shows lattice fringes corresponding to a Pd(111) layer separation of 0.226±0.005. Particle size counting from TEM micrographs reveal that 48% of the metal particles were smaller than 5 nm in diameter and the smaller particles were mainly found inside the nanotubes. They were also large palladium particles deposited outside the carbon nanotubes. If the nitric acid-palladium nitrate nanotubes product mixture was concentrated under reduced pressure until a paste was formed which was then placed on a filter paper and excess solvent then removed by pressing self roll filter papers on to the top of the residue, then the palladium content was reduced from 10% to 2.2%. After hydrogen reduction a TEM study showed an average palladium particle size of 3.3 nm with 88% of the palladium particles being smaller than 5 nm, and there were only traces of large external palladium particles.

EXAMPLE 6

Sample A was prepared using a purified sample of the cysteine rich protein, Zn-Cd metallothionein (rabbit liver, metallothionein/II with Zn:Cd molar ratio of 2:5, M.W.=7 kDa) (0.55 mg) in 2 ml of distilled water (39.3 μM) and mixed with 2.0 mg of an opened nanotube sample. The micrographs showed most of the nanotubes have internal cross section of 3–5 nm and the ends of >90% of the tubes were open. All of the opened tubes contained distinct darker grey areas in the inner tubes careful energy-dispersive X-ray (EDX) analysis of selected protruding tubes containing the internal grey areas showed the presence of Cd, Zn and S over the grey areas and there was no visible external amorphous material. Therefore, we infer that the grey internal patches comprise protein based material. These are observed along the entire length of the tubes and, interestingly, they occur at fairly regular separations of 15–25 nm.

The sample B was prepared by treatment of opened nanotubes (2.7 mg) with a solution of purified cytochrome $c_3$ (*Desulfovibrio vulgaris*, M.W.=14 kDa) (25 μM using 0.7 mg cytochrome $c_3$ in 2 ml of distilled water). HRTEM photographs show many grey areas of amorphous material on the exterior surfaces of the nanotube. However, there are also some clearly visible grey patches inside the tube cavities and careful EDX analyses over these showed the presence of iron. These grey areas are quasi-spherical and of dimension smaller than that of the host inner tube. The diameters of the smallest grey patches in the tube are about 3.3 nm—of similar size to cytochrome $c_3$ (a spherical protein with a 3.0 nm diameter and having 4 haem units). It seems probable that the quasi-spherical grey areas are due to single protein molecules. There are also some larger grey areas inside the tubes of about 13.5 and 17 nm in length which may be attributed to protein aggregates.

Sample C was prepared by treatment of opened tubes (20 mg) with the purified enzyme, β-lactamase I (*Bacillus cereus* M.W.=29 kVa) (0.11 mg) dissolved in 1 ml of distilled water (3.8 μM). A HRTEM examination of sample C showed the presence of grey amorphous material, on both the interior and exterior surfaces of the tubes (on the front content). The β-lactamase I is small enough (3.3×3.8×4.9 nm$^3$) to fit into the inner tube cavity and we presume, therefore, that the grey areas consist of aggregates of this protein.

A sample of purified flavocytochrome $b_2$ tetramer (*Saccharomyces cerevisiae*, M.W.=230 kDa) (0.22 mg) in 2 ml of distilled water (0.94 µM) was tested for redox activity, prior to the addition of tubes, to confirm that the active tetrameric structure has been retained.

Sample D was prepared with the addition of 20 mg of opened nanotubes to this solution. Examination of sample D by HRTEM showed the presence of grey areas on the nanotube external surface only: no grey areas were observed inside the tubes. The absence of these, in the case of this protein, is not surprising since the ellipsoidal flavocytochrome $B_2$ tetramer is too large (10 nm in diameter, 6 nm thick) to enter into a rigid internal tube cavity.

We have carried out experiments on samples B, C, and D designed to establish the stability of attachment of the proteins to the carbon surfaces. Typically, sample B in an eppendorf was shaken with water, with buffered aqueous solutions of different pH or with aqueous sodium chloride (2 M), each for 12 hours. Spectroscopic analysis of the supernatant solutions showed, for sample B, and C, that no protein has been extracted and for sample D that greater than sot of cytochrome $B_2$ remained immobilised. Thus, the proteins are firmly attached to the carbon surfaces and it seems likely that the acidic sites known to be present contribute to the protein binding.

β-Lactamase I displays extremely fast turnover rates. We have carried out activity studies on the hydrolysis of phenoxymethylpenicillin (penicillin V) by nanotube-immobilized β-lactamase I. The immobilised β-lactamase sample was treated with an excess of penicillin V (1 mM) so that the initial rate of hydrolysis was proportional only to the total concentration of protein used. In the absence of immobilised protein no hydrolysis of substrate was observed. The initial rate of hydrolysis was determined by analysis of progressive curves for the initial 5 minutes of the reaction obtained by monitoring absorbance changes at 232 nm. Solutions of β-lactamase used for the preparation were calibrated for activity and gave an average turnover number of 1042 $s^{-1}$ in agreement with literature value. The immobilised β-lactamase sample showed moderate activity (16.4% compared to standard solutions). The decrease in activity may be associated with the various effects of immobilisation but at least some of the proteins retain active site structure. On washing the immobilized sample with distilled water and then adding the same substrate concentration, activity was unchanged.

EXAMPLE 7

Carbon nanotubes which have been opened and filled may be further reacted with chemicals to give a new material (or chemical or compound) in the tube as a general method for making a different desired compound inside a nanotube e.g. NiO to Ni reduced by $H_2$, CdO to CdS by treatment with $H_2S$, mixed oxides such as $FeBiO_3$ made by a general solid state synthesis method—put solutions of bismuth nitrate and iron nitrate inside the tube then heat so as to form the phase (compound) $FeBiO_3$.

A sample of raw nanotube material (300–500 mg) was added to a solution of a chosen metal nitrate(s) (2.5–10% w/w) in concentrated Analar nitric acid (14 ml of 69% solution of $HNO_3$ in water). The mixture was stirred and heated at 130° C. for up to 8 hours.

The tubes were then removed from the nitric acid. This was accomplished either by decanting the supernatant liquid, then driving off the volatiles in a drying oven at 90° C., or by evaporating the volatiles on a rotary evaporator until a paste remained, followed by drying on filter paper and then drying in an oven at 90° C.

Each dried sample was then placed in a tube furnace under a flow of argon, The samples were ramped at 2° C. per minute to a temperature appropriate to the oxide being synthesized (450–950° C.), They were kept at this temperature for periods up to 7 days.

By these experiments the following oxides were successfully encapsulated in opened nanotubes; dCO, praseodymium oxide, $La_2O_3$, cerium oxide , $LaCoO_3$, $FeBiO_3$, $MgCeO_3$, $LaFeO_3$, $LaCrO_3$.

Conversion of the dried CdO filled tubes to CdS filled tubes was accomplished by high temperature reaction with diluted hydrogen sulphide. The CdO filled tubes were placed in a furnace at 350° C. for 24 hours under a flow of 83% $H_2S$ in $N_2$. This resulted in conversion of the oxide to sulphide, as observed by electron diffraction and HRTEM.

EXAMPLE 8

Opening of Closed Nanotubes Using Acidified Potassium Permanganate

A sample of closed carbon nanotubes was added to an acidified ($H_2SO_4$) solution of $KMnO_4$. A slurry was obtained by vigorous stirring, and the resultant suspension was heated at 50–100° C. for three days. The initial purple solution turned colourless. The resultant solid was washed thoroughly with distilled water.

Opening of Nanotubes in a Basic Non-aqueous Media;

EXAMPLE 9

Opening of the Tubes in Molten Media in Air:

Many molten media and eutectic molten mixture (molten alkali, molybdate, borates, phosphates, oxides, etc.) are corrosive which can dissolve a wide variety of materials. Some can also carry considerable amount of dissolved oxygen. As many materials will be carried in a melt which are ordinarily insoluble in other media, then opening of the tubes using this solvent may provide a method of synthesising acid insoluble materials inside the tubes.

A typical example is given as follows; A mixture of KOH (m.p. 360° C.) and NaOH (m.p. 318° C.) in a ratio KOH:NaOR of 3:2 forms a eutectic mixture with melting range at about 200° C. It provides a useful solvent for synthesis between 200 and 1000° C. for many ionic materials. Thus, the addition of closed tubes to the eutectic hydroxide melt resulted in a slurry with no visible change in either the solution and/or the tubes. Initially the tubes floated and after approximately 5 minutes became wetted and moved below the meniscus. The tubes were stirred at 225° C. The melt was cooled and dissolved in water, filtered and the black residue was washed with ethanol and dried in air at 100° C. Examination of the solid using HRTEM showed opening, although in a limited way. Initial tests with this system with heating for 20 mins. showed no appreciable opening. However, opening was observed after heating at the same temperature for 2 hours. About 40% of the tubes were opened in this manner. The oxidation in this reaction is thought to be due to the dissolved oxygen since the reaction was being performed in air and the molten flux also provides catalytic oxidation at this temperature.

EXAMPLE 10

Molten Media with Redox Active Metal Ions for Opening of the Tubes:

From the above, the opening of the tubes is slow in an eutectic hydroxide melt. Addition of redox active materials (transition metal ions) to the eutectic mixture may catalyse oxidation leading to opening of the nanotubes more readily given that the thermodynamic values are favourable under reaction conditions.

A typical example is the addition of copper oxide $Cu_2O$ to a eutectic (K, Na)OH at 250° C. in air resulted in the instant formation of a dark blue molten mixture, as Cu(I) was oxidised to Cu(II). Addition of tubes to this mixture resulted in no change in colour. The mixture was stirred for two hours. On cooling, water was added to the mixture in order to cool it as well as dissolve the solidified hydroxide mass. A very pale blue solution was then filtered and dried, prior to examination by HRTEM. A light grey/blue solid was obtained, assumed to be mainly $Cu(OH)_2$ with embedded tubes. Examination of the tubes showed a large amount of tubes were opened (>80) and some sort of coating on the tube surface and sometimes "unzipping" of tubes were also observed. It can be envisaged that reduction of copper ions (Cu(I) and Cu(II)) by carbon, with oxygen transfer either from the malt or coupled by other redox metal ions, can be taking place rapidly. Reoxidation of the copper (I) or also copper metal by dissolved oxygen to a higher oxidation state, probably to Cu (II) can then occur, and complete the catalytic cycle.

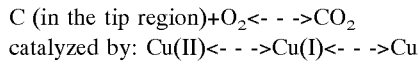

EXAMPLE 11
Opening and Simultaneous Purification of Nanotubes

The crude carbon nanotubes produced in an arc plasma usually contain other forms of carbon such as nanoparticles and amorphous carbon. On one sample basically more than 30% of the structures present are nanoparticles and also amorphous carbon can be easily seen.

Herein we describe a method used to purify nanotubes from nanoparticles, which is the selective destruction of nanoparticles by intercalation and then burning with oxygen.

$Br_2$ Intercalation

The intercalation of bromine into normal graphite can be carried out at room temperature by simply immersing the graphite in liquid bromine. After few hours a compound with composition $Ca_8Br$ can be obtained. An expansion of the graphite of 55% with repeated distance of 1.03 nm along the c axis can be observed, The intercalation occurs as one bromine layer to every two graphite layers, with a spacing of 0.35 nm between the bromine and the graphite layer. The intercalation of bromine in graphite thus causes a large interlamelar expansion of 55%. The graphite layers are independent and can be readily separated.

However, the nanotubes and nanoparticles have a rigid structure similar to cylinders inside one another. If these cylinders try to expand against each other a strain is present in the structure and in some cases this tension will lead to rupture and collapse of the nanotube structure. We have studied the intercalation of bromine in a freshly prepared closed nanotubes sample. As the nanotubes are closed we expect that no intercalation should take place. However, nanoparticles have been suggested in the literature to have open edges and thus may undergo destructive intercalation. Therefore, it may provide a way to destroy nanoparticles without damaging the nanotubes.

We refluxed a mixture of closed nanotubes with liquid bromine at 70° C. for 3 to 7 days. The bromine was then evaporated under vacuum and the sample extensively washed with petroleum ether.

The powder XRD analyses of this material showed similar diffraction pattern with lower intensities and broader peaks compared to the original nanotubes sample. This has also been observed before when sample of nanotubes were intercalated and deintercalated with alkaline metals. The powder XRD pattern is consistent with the literature and is very similar to the pattern observed for the turbostratic graphite. The most intense peak is the equivalent to the [002] peak in graphite. The average interlayer distance 0.344 nm is 0.009 nm larger than crystalline graphite and reflects the lack of positional correlation between carbon atoms in different layers within the nanotube.

The HRTEM studied of the bromine treated sample revealed that most of the nanotubes did not show serious damage. On the other hand, most of the nanoparticles were damaged, showing semi and completely destroyed structures.

TPO of Bromise Treated Nanotubes

Temperature Programmed Oxidation (TPO) profiles for our bromine treated nanotubes were obtained by slowly heating (5° C./min) the sample under an oxygen (4% in helium) flow from room temperature to 800° C. and monitoring the formation of carbon oxides by a gas chromatograph. The TPO of freshly prepared nanotubes samples shows a small shoulder at 540° C. due to graphite and the on-set temperature around 600° C. At 600° C. the more reactive parts of nanostructures, namely the edges of nanoparticles and the cap region of nanotubes, start being oxidised. On the other hand, the TPO profile for bromine reacted nanotubes sample is completely different.

The oxidation rate slowly increases from 250° C. This indicates the presence of small amounts of carbons with semi-amorphous texture which are intermediate between completely amorphous carbon and graphite. This might relate to the burning of the structures semi-destroyed. Moreover, after the treatment with bromine the on-set temperature decreased to about 530° C. which is approximately 70° C. lower than the original fresh nanotubes.

Selective Burning of the Nanoparticles

A sample of bromine treated nanotubes was heated to 530° C. under a flow of oxygen (4% in helium) for 2 days. At the high temperature 530° C. any amorphous carbon or graphite fragment should burn in the presence of oxygen. However, nanotubes should start burning at temperatures only higher than 600° C.

After 2 days at 530° C. approximately 90% of the sample was burnt out and the HRTEM showed the material obtained was very rich in nanotubes. Basically, no nanoparticles are seen and the nanotubes surface are apparently slightly damaged.

In conclusion, the above observations demonstrate a very simple method for the introduction of metal ions into nanotubes in which the tubes are opened by a liquid phase oxidising agent (aqueous nitric acid) in very high yield at mild temperatures. The liquid phase oxidation is so specific towards non-six membered carbon rings in the tip regions that no thinning or stripping of carbon layers has been observed, in contrast to the reported gas phase oxidations. In most cases the internal carbon partitions are also removed.

We anticipate that the above observations will lead to extensive study of the chemistry and physics of filled nanotubes. Applications in separations (analogues for zeolites), heterogeneous catalysis (shape selective), bulk properties (new magnetic and electrical properties) and storage of chemicals (radioactive substances, methane storage, slow release of drugs), can be envisaged.

REFERENCES
1. Iijima S., Nature, 354, 56–58 (1991).
2. Ebbesen T. W. and Ajayan P. M., Nature, 358, 220–222 (1992).
3. Dresselhaus M. S., Nature, 358, 195–196 (1992) and references therein.
4. Ruoff, R. S., Lorents, D. C., Chan, B., Malhotra, R. and Subramoney, S., Science, 259, 346-(1993).

5. Tomita, M., Saito, Y. and Hayashi, T., Jpn. J. Appl. Phys., 32, L280-(1993).
6. Seraphin, S., Zhou, V., Jiao, J., Withers, J. C. and Loufty, R., Nature, 362, 503 (1993).
7. Saito, Y., Yoshikawa T., Okuda, M., Ohkohchi, M. Ando, Y., Kasuya, A. and Nishina, Y., Chem. Phys. Lett., 209, 72-(1993).
8. Saito, Y., Yoshikawa T., Okuda, M., Fujimoto, N., Sumiyama, K., Suzuki, K., Kasuya, A. and Nishina, Y., J. Phys. Chem. Solids, 54, 1849–1860 (1993).
9. Murakami, Y., Shibata, T., Okuyama K., Arai, T., Suematsu, H. and Yoshida, Y., J. Phys. Chem. Solids, 54, 1861–1870 (1993).
10. Ajayan, P. M. and Iijima S., Nature, 361, 333–334 (1993).
11. Tsang, S. C., Harris, P. J. F. and Green, M. L. H., Nature 362, 520–522 (1993).
12. Ajayan, P. M., Ebbesen, T. W., Ichihashi, T., Iijima S., Tanigaki K. arnd Hiura H., Nature, 362, 525–525(1993).
13. Harris, P. J. F., Green, M. L. H., and Tsang, S. C., J. Chem. Soc., Faraday Trans., 89, 1189–1192 (1993).

What is claimed is:

1. A method of making carbon nanotubes open on at least one end, which method comprises treating capped nanotubes by refluxing said capped nanotubes in a liquid phase oxidizing acid which is capable of opening capped nanotubes, said treatment being effective to open at least 50% of the nanotubes on at least one end.

2. A method according to claim 1, wherein the nanotubes are refluxed in nitric acid.

3. A method of making carbon nanotubes open on at least one end and containing material deposited therein, which method comprises treating capped nanotubes by refluxing said capped nanotubes in a liquid phase oxidizing acid which is capable of opening capped nanotubes and which contains dissolved or dispersed therein a material for deposition in the uncapped nanotubes, said treatment being effective to open at least 50% of nanotubes on at least one end.

4. A method according to claim 3, wherein the oxidising acid is nitric acid.

5. A method as claimed in claim 3, wherein the material for desposition in the uncapped nanotubes is a metal salt.

6. A method as claimed in claim 1, wherein the nanotubes which have been opened on at least one end are treated with a liquid containing dispersed or dissolved therein a material for deposition in the uncapped nanotubes.

* * * * *